(12) United States Patent
Harada (10) Patent No.: US 8,643,914 B2
(45) Date of Patent: Feb. 4, 2014

(54) IMAGE-READING DEVICE AND MANUFACTURING METHOD THEREOF

(75) Inventor: Yuya Harada, Okazaki (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 89 days.

(21) Appl. No.: 13/431,320

(22) Filed: Mar. 27, 2012

(65) Prior Publication Data

US 2012/0250109 A1    Oct. 4, 2012

(30) Foreign Application Priority Data

Mar. 29, 2011  (JP) ................................. 2011-073198
Mar. 9, 2012   (JP) ................................. 2012-052635

(51) Int. Cl.
*H04N 1/04*  (2006.01)

(52) U.S. Cl.
USPC ............ 358/475; 358/474; 358/496; 358/497

(58) Field of Classification Search
USPC .......................... 358/475, 474, 496, 497, 498
See application file for complete search history.

(56) References Cited

U.S. PATENT DOCUMENTS

| | | | |
|---|---|---|---|
| 4,806,775 A | 2/1989 | Uchida | |
| 8,018,603 B2 * | 9/2011 | Honguh | ........................ 356/600 |
| 2002/0054387 A1 | 5/2002 | Yokota et al. | |
| 2008/0180763 A1 | 7/2008 | Nishizawa et al. | |

FOREIGN PATENT DOCUMENTS

| | | |
|---|---|---|
| JP | 63-113368 U | 7/1988 |
| JP | 4-37252 A | 2/1992 |
| JP | H07-030732 A | 1/1995 |
| JP | 2001-157052 A | 6/2001 |
| JP | 2002-57853 A | 2/2002 |
| JP | 2004-004188 A | 1/2004 |
| JP | 2004-080448 A | 3/2004 |
| JP | 2004-120656 A | 4/2004 |
| JP | 2004-140534 A | 5/2004 |
| JP | 2005-159720 A | 6/2005 |
| JP | 2005-191795 A | 7/2005 |
| JP | 2007-124110 A | 5/2007 |
| JP | 2008-193167 A | 8/2008 |

OTHER PUBLICATIONS

Japanese Office Action dated Jul. 2, 2013 from corresponding Japanese Application No. 2012-052635, together with an English language translation.

* cited by examiner

*Primary Examiner* — Houshang Safaipour
(74) *Attorney, Agent, or Firm* — Scully, Scott, Murphy & Presser, PC (57) ABSTRACT

A first light intensity curve is defined as a relationship between a first light intensity and a distance from a first reading unit. The first light intensity represents intensity of light that is part of a reflected light reflected off a first irradiated subject positioned at a distance from the first reading unit and is received by a first light-receiving unit. The first light intensity curve has a first intensity value at a first distance and a second intensity value at a second distance. The first intensity value is equivalent to the second intensity value. The first distance is different from the second distance. A distance between the first reading unit and a first read position is set to the first distance. A distance between the first reading unit and a first reference member is set to the second distance.

7 Claims, 11 Drawing Sheets

IMAGE-READING DEVICE AND MANUFACTURING METHOD THEREOF

CROSS REFERENCE TO RELATED APPLICATION

This application claims priority from Japanese Patent Application Nos. 2011-073198 filed Mar. 29, 2011 and 2012-052635 filed Mar. 9, 2012. The entire content of the priority application is incorporated herein by reference.

TECHNICAL FIELD

The present invention relates to an image-reading device.

BACKGROUND

There are image-reading devices known in the art that match the distance from the image-reading unit to the reference member that is related to shading correction to the distance from the image-reading unit to the read position that is related to image reading. Specifically, the reference member is mounted over the read position during shading correction and removed from the read position when reading an image from an original. Alternatively, the reference member is moved to the read position during shading correction and retracted from the read position during image reading.

SUMMARY

Thus, the inherent shortcoming in the conventional image-reading device described above is that the reference member must be removed or the image-reading unit requires a mechanism for moving the reference member.

This specification discloses a technique for generating shading correction data that minimizes the effects of a difference between the distance from the image-reading unit to the reference member for shading correction and the distance from the image-reading unit to the read position for image reading, without requiring an operation to remove the reference member or the addition of a mechanism for moving the reference member.

In order to attain the above and other objects, the present invention provides an image forming device including: a first reading unit, a first reference member, and a control unit. The first reading unit includes a first light source and a first light-receiving unit and configured to read a first image on an original at a first read position. The first reading unit is configured such that the first light source emits a light, part of the light is reflected off a first irradiated subject, part of a first reflected light is received by the first light-receiving unit. The control unit is configured to execute a first image-reading process, a first reference-reading process, and a first data generating process. In the first image-reading process, the first light source emits a light to the first read position to irradiate the original and the first light-receiving unit receives part of a reflected light reflected off the original. In the first reference-reading process, the first light source emits a light to the first reference member and the first light-receiving unit receives part of a reflected light reflected off the first reference member. In the first data generating process, shading correction data is generated based on a receiving result of the first light-receiving unit in the first reference-reading process. A first light intensity curve is defined as a relationship between a first light intensity and a distance from the first reading unit. The first light intensity represents intensity of light that is part of a reflected light reflected off the first irradiated subject positioned at the distance from the first reading unit and is received by the first light-receiving unit. The first light intensity curve has a first intensity value at a first distance and a second intensity value at a second distance. The first intensity value is equivalent to the second intensity value. The first distance is different from the second distance. A distance between the first reading unit and the first read position is set to the first distance. A distance between the first reading unit and the first reference member is set to the second distance.

According to another aspect, the present invention provides a manufacturing method of an image-reading device. The image-reading device includes an reading unit and a reference member. The reading unit includes a light source and a light receiving unit and configured to read an image on an original at a read position. The reading unit is configured such that the light source emits a light, part of the light is reflected off an irradiated subject, part of a reflected light is received by the light-receiving unit. The manufacturing method includes: acquiring a light intensity curve that is defined as a relationship between a light intensity and a distance from the reading unit, the light intensity representing intensity of light that is part of a reflected light reflected off the irradiated subject positioned at the distance from the reading unit and is received by the first light-receiving unit, the light intensity curve having a first intensity value at a first distance and a second intensity value at a second distance, the first intensity value being equivalent to the second intensity value, the first distance being different from the second distance; and setting a distance between the reading unit and the read position to the first distance, and setting a distance between the reading unit and the reference member to the second distance.

DETAILED DESCRIPTION

First Embodiment

An image-reading device 1 according to a first embodiment of the present invention will be described with reference to FIGS. 1 through 7. The terms "upward", "downward", "upper", "lower", "above", "below", "beneath" and the like will be used throughout the description assuming that the image-reading device 1 is disposed in an orientation in which it is intended to be used. More specifically, in FIGS. 1 through 3 and FIG. 7, a side of a discharge tray 4 will be referred to as "front side", and a side opposite to the discharge tray 4 will be referred to as "rear side". Further, the terms "right side" and "left side" will be used when viewed from the printer 1 from the front side.

1. Mechanical Structure of the Image-Reading Device

The image-reading device 1 includes a tray 2, a main body 3, and the discharge tray 4. The tray 2 supports a sheet of an original M (see FIG. 2). As the original M is conveyed into the main body 3, an image-reading unit 24 described later (see FIG. 2) inside the main body 3 reads an image from the original M being conveyed into the main body 3. After the image has been read, the original M is discharged onto the discharge tray 4. The image-reading device 1 with this configuration is called a "sheet feed scanner." The original M may include sheets of paper, plastic, or the like.

Figure 1:
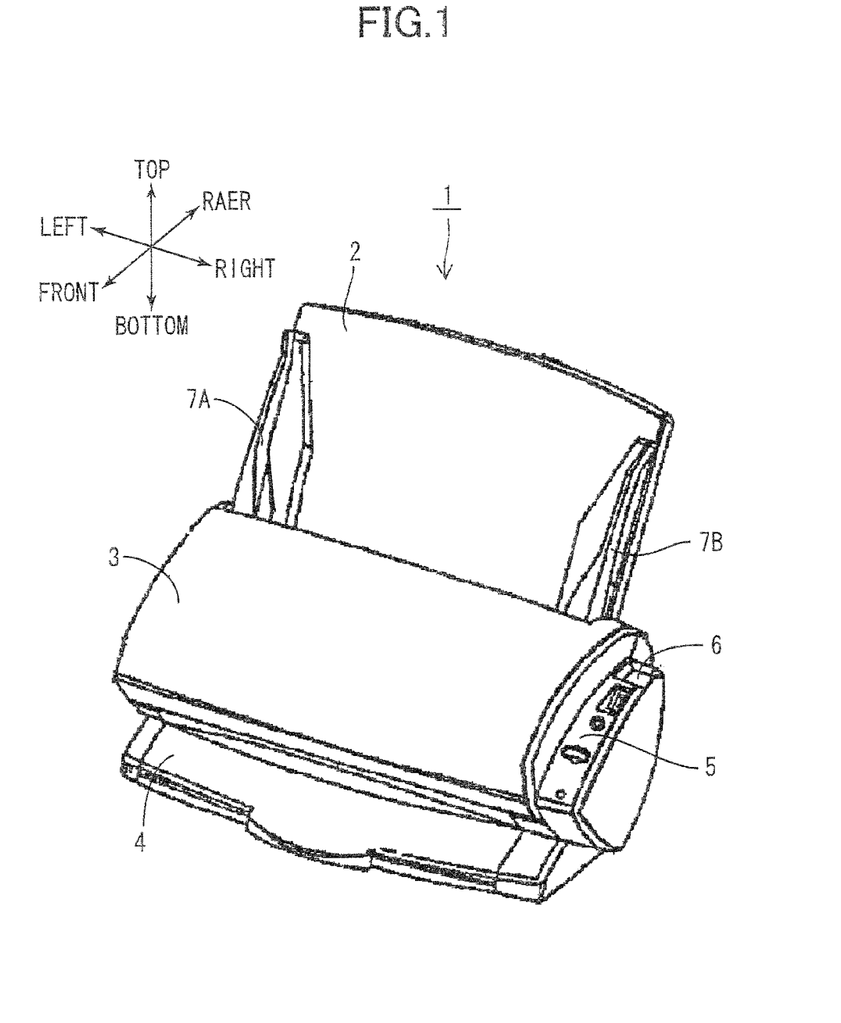
FIG. 1 is a perspective view showing an external appearance of the image-reading device according to a first embodiment of the present invention.

The tray 2 is disposed on the rear side of the main body 3 and slopes down toward the front. Guides 7A and 7B are provided on left and right sides of the tray 2 and are capable of sliding in the left and right directions. By pushing the guides 7A and 7B farther apart or closer together, the user can adjust the gap between the guides 7A and 7B to be equivalent to the left-to-right width of the original. One or a plurality of sheets of the original M may be set between the guides 7A and 7B.

Figure 2:
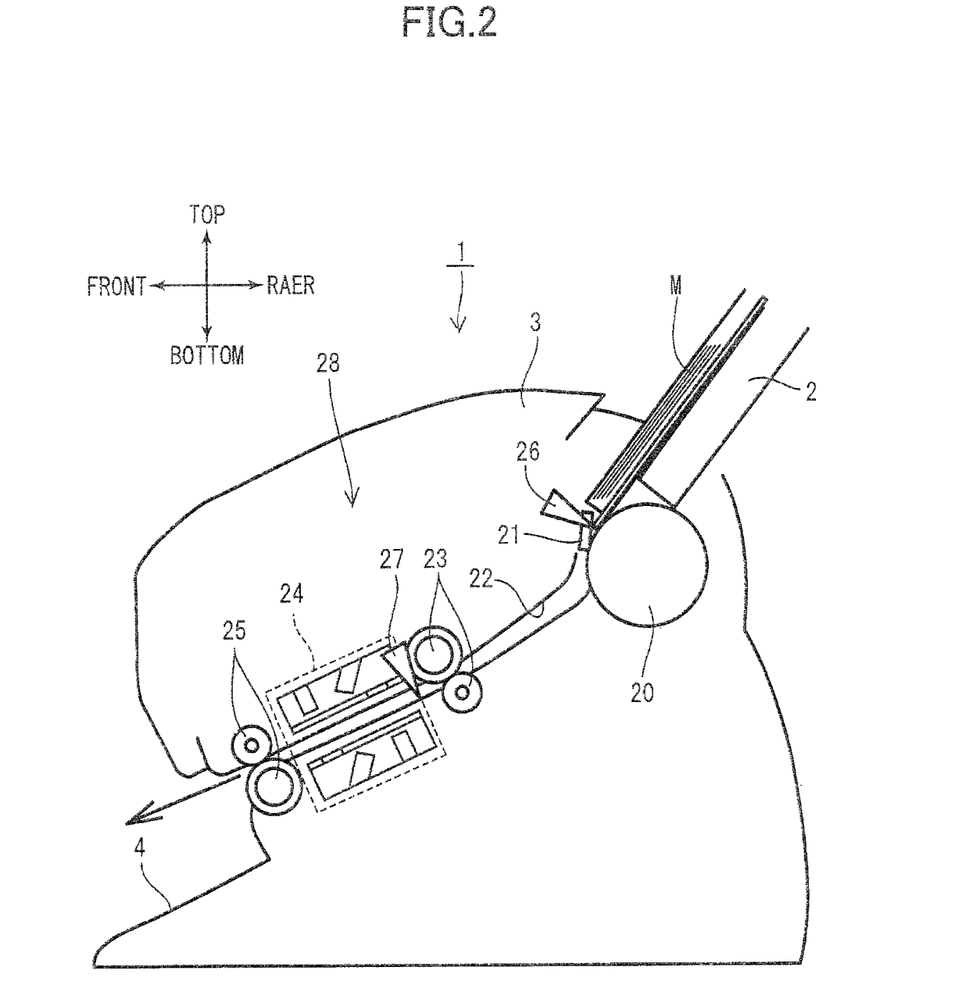
FIG. 2 shows a general internal structure of the image-reading device.

As shown in FIG. 2, a paper-conveying path 22 is formed inside the main body 3, extending from the front end of the tray 2 to the rear end of the discharge tray 4. Along this paper-conveying path 22 are provided a pickup roller 20, a separating pad 21, conveying rollers 23, an image-reading unit 24, discharge rollers 25, a front sensor 26, and a rear sensor 27.

The pickup roller 20 is disposed on the front side of the tray 2. Through frictional force, the rotating tray 2 pulls one or a plurality of sheets of the original M from the tray 2 into the main body 3. The separating pad 21 is disposed so as to confront the pickup roller 20 and, through frictional force, to separate the plurality of sheets of the original M so that only one sheet is fed into the main body 3 at a time.

The conveying rollers 23 are disposed farther downstream in the paper-conveying path 22 than the pickup roller 20 and separating pad 21. The conveying rollers 23 are driven by a motor (not shown) to convey a sheet of the original M on the paper-conveying path 22 forward. The image-reading unit 24 is disposed downstream in the paper-conveying path 22 from the conveying rollers 23. The image-reading unit 24 reads an image of the original M conveyed by the conveying rollers 23.

The discharge rollers 25 are disposed on the downstream side of the image-reading unit 24 in the paper-conveying path 22. The discharge rollers 25 convey sheets of the original M out of the main body 3 after the sheets have undergone an image-reading process in the image-reading unit 24. The discharge tray 4 is disposed on the front side of the main body 3. Sheets of the original M conveyed out of the main body 3 are stacked on the discharge tray 4. Together, the paper-conveying path 22, pickup roller 20, conveying rollers 23, and discharge rollers 25 constitute a conveying mechanism 28.

The front sensor 26 is disposed near the front end of the tray 2. The front end of the tray 2 functions. The front sensor 26 detects the presence of the original M on the tray 2 and outputs a detection signal SG1 based on the detection results. The rear sensor 27 is disposed on the upstream side of the image-reading unit 24. The rear sensor 27 detects the presence of a sheet of the original M in the paper-conveying path 22 and outputs a detection signal SG2 based on the detection results. The front sensor 26 and rear sensor 27 may be configured of pressure sensors or other contact sensors, or non-contact sensors such as photosensors and magnetic sensors.

Figure 3:
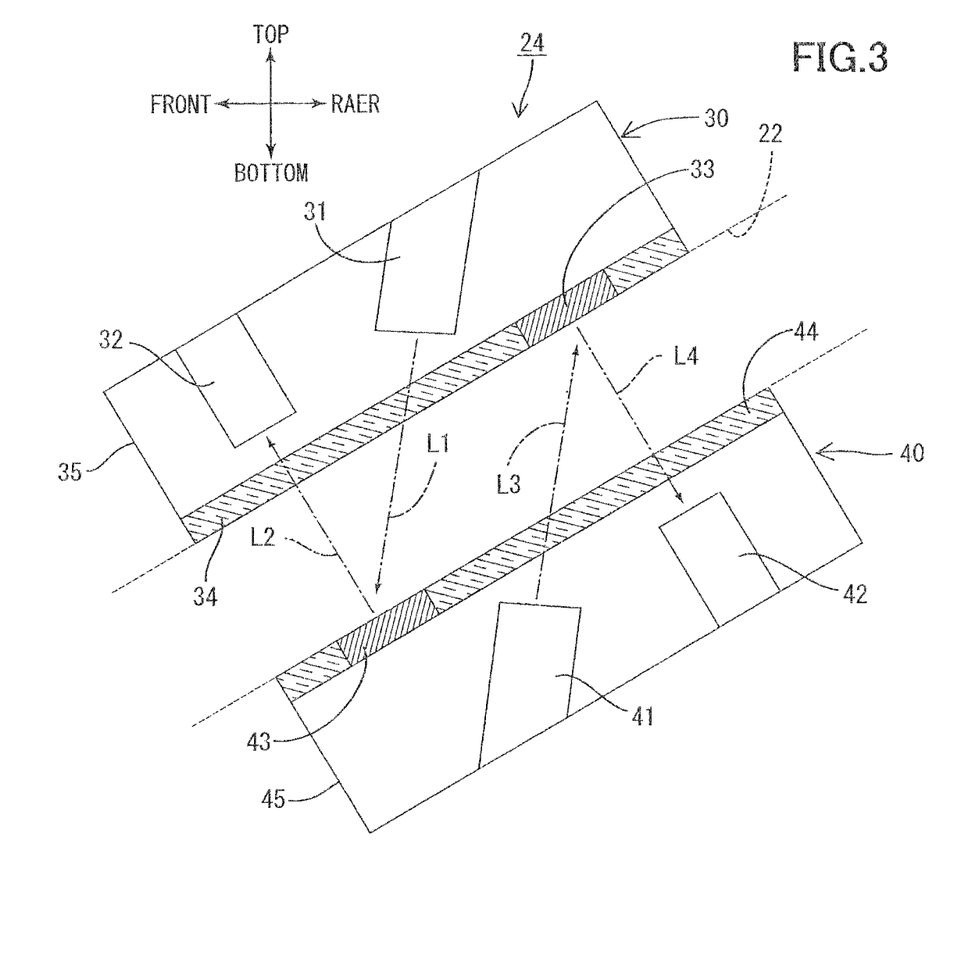
FIG. 3 illustrates a general structure of an image-reading unit of the image-reading device.

The image-reading unit 24 includes a pair of reading devices 30 and 40 confronting each other across the paper-conveying path 22. The reading devices 30 and 40 are incapable of moving relative to each other in the paper-conveying direction. The reading devices 30 and 40 are preferably compact image sensors (CIS) or charge-coupled drive image sensors (CCD).

The reading device 30 is disposed above the paper-conveying path 22 and functions to read an image from one surface (i.e., the top surface) of the original M as the original M is conveyed through the image-reading unit 24. The reading device 30 includes a light source 31, a light-receiving unit 32, a reference member 33, a platen glass 34, and a carriage 35. The light source 31 is provided with a light-emitting element, such as a light-emitting diode (LED). In addition to the light-emitting element, the light source 31 may include an optical system having transmitter lenses and the like. The light-receiving unit 32 is configured of a plurality of light-receiving elements (not shown) juxtaposed in the left-to-right direction. The platen glass 34 is disposed along the paper-conveying path 22. The light source 31 emits a light L1 through the platen glass 34 so as to strike a sheet of the original M being conveyed through the paper-conveying path 22 or a reference member 43 of the reading device 40 described below. The light-receiving unit 32 receives a reflected light L2 reflected off the original M or the reference member 43. More specifically, the light source 31 emits a light, part of the light is reflected off the sheet of original M or the reference member 43 as the light L1, and part of a reflected light is received by the light-receiving unit 32 as the reflected light L2.

The reading device 40 is disposed below the paper-conveying path 22 and functions to read an image from the other surface (i.e., the bottom surface) of the original M being conveyed through the image-reading unit 24. The reading device 40 includes a light source 41, a light-receiving unit 42, the reference member 43, a platen glass 44, and a carriage 45. The light source 41 and light-receiving unit 42 have the same construction as the light source 31 and light-receiving unit 32 described above. The platen glass 44 is disposed along the paper-conveying path 22. The light source 41 irradiates a light L3 through the platen glass 44 so as to strike a sheet of the original M being conveyed along the paper-conveying path 22 or the reference member 33 of the reading device 30. The light-receiving unit 42 receives a reflected light L4 that has been reflected off the original M or the reference member 33. More specifically, the light source 41 emits a light, part of the light is reflected off the sheet of original M or the reference member 43 as the light L3, and part of a reflected light is received by the light-receiving unit 42 as the light L4.

The reference members 33 and 43 in this embodiment are white reference plates, but may be another color, such as gray. Further, rather than embedding the reference members 33 and 43 in their respective platen glasses 34 and 44, as shown in FIG. 3, the reference members 33 and 43 may be provided on the front or rear surfaces of the platen glasses 34 and 44. As shown in FIG. 3, the reading device 30 acquires white reference data from the reference member 43 of the reading device 40 required for shading correction and the like. The reading device 40 acquires white reference data from the reference member 33 of the reading device 30 required for shading correction and the like.

As shown in FIG. 1, a control unit 5 and a display unit 6 are also provided on the main body 3. The control unit 5 includes a power switch and various buttons for receiving commands and the like from the user. The display unit 6 displays the status of the image-reading device 1 and images that the image-reading unit 24 has read from an original.

2. Electrical Structure of the Image-Reading Device

Figure 4:
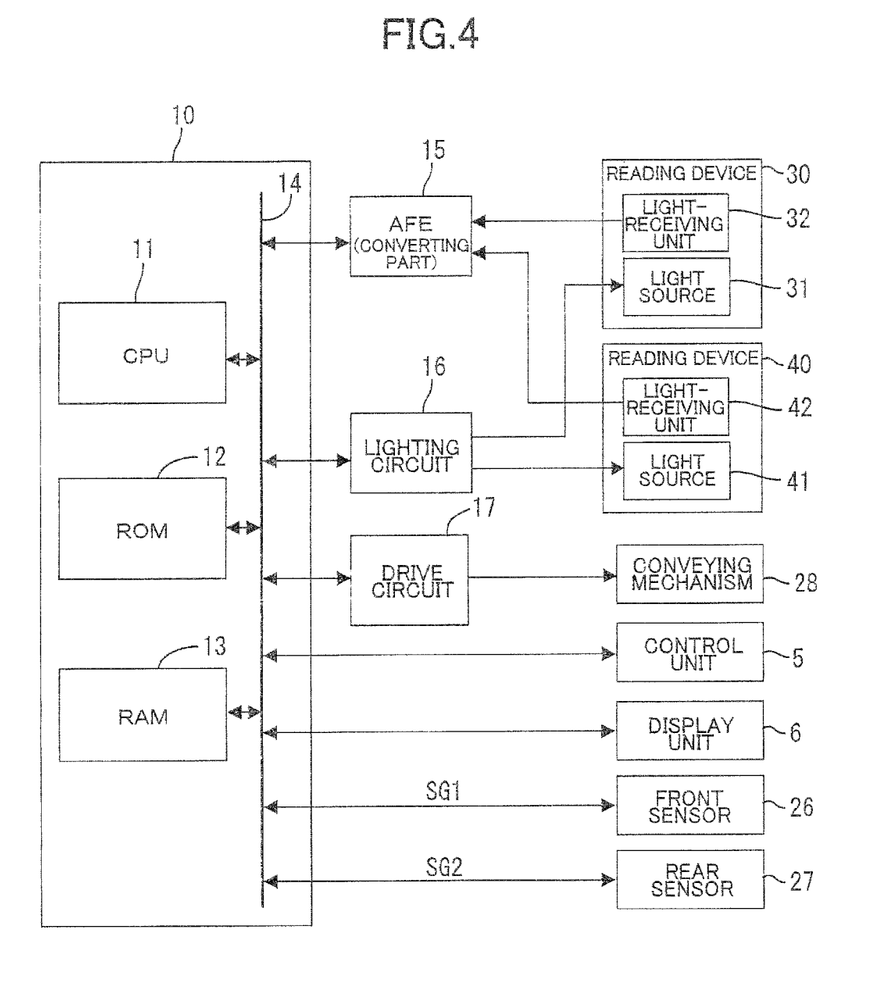
FIG. 4 is a block diagram showing a general electrical structure of the image-reading device.

The image-reading device 1 includes a control circuit 10 for controlling all components in the image-reading device 1. As shown in FIG. 4, the control circuit 10 has a central processing unit (CPU) 11, a ROM 12, and a RAM 13. A bus 14 provided in the control circuit 10 connects the CPU 11, ROM 12, and RAM 13 to the control unit 5, the display unit 6, an analog front end (AFE) 15, a lighting circuit 16, a drive circuit 17 for driving the rollers of the conveying mechanism 28, the reading devices 30 and 40, the front sensor 26, the rear sensor 27, and the like.

The ROM 12 stores various programs including a control program for controlling operations of the image-reading device 1. The CPU 11 controls the components of the image-reading device 1 based on the control programs read from the ROM 12.

The lighting circuit 16 is connected to each of the reading devices 30 and 40. The lighting circuit 16 transmits a signal to the reading devices 30 and 40 for lighting the light sources 31 and 41, respectively, and controlling their exposure times in response to commands from the CPU 11. When a signal is received from the lighting circuit 16, the reading devices 30 and 40 light the respective light sources 31 and 41 so that light is emitted from the light sources 31 and 41 over the indicated exposure time. While the light sources 31 and 41 emit light, the light-receiving units 32 and 42 receive light reflected off a sheet of the original M conveyed through the paper-conveying path 22 or the reference members 43 and 33, based on commands from the CPU 11, and output read voltages to the AFE 15. The read voltages are analog signals corresponding to the intensities of light received by the light-receiving units 32 and 42, respectively. In other words, the reading devices 30 and 40 receive reflected light with the light-receiving elements of the light-receiving units 32 and 42, respectively, and sequentially output read voltages corresponding to the intensities of light L2 or L4 received by their respective light-receiving elements to the AFE 15.

The AFE 15 is connected to each of the reading devices 30 and 40. The AFE 15 has an A/D converter circuit for converting the read voltages outputted from the reading devices 30 and 40 into digital signals serving as read data based on commands from the CPU 11. The AFE 15 has a predetermined resolution (for example, a resolution of 8 bits for the range of values 0-255). The AFE 15 converts the analog read voltage outputted from the reading device 30 or 40 to 8-bit (0-255) read data. The AFE 15 stores this read data in the RAM 13 via the bus 14.

Figure 5:
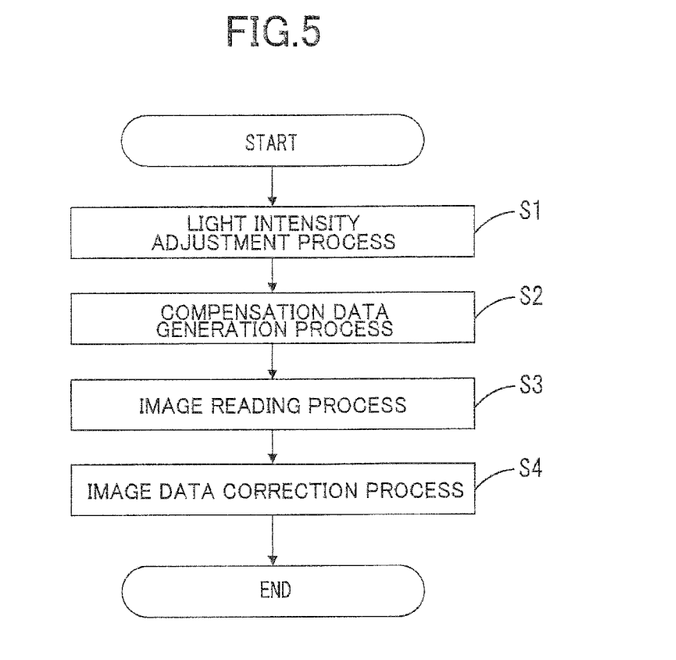
FIG. 5 is a flowchart illustrating steps in a control process executed by a CPU of a control circuit of the image-reading device for reading an image.

3. Control Process Executed by the Control Circuit (1) Light Intensity Adjustment Process As shown in FIG. 5, when the CPU 11 receives a command to begin reading an image as a result of an operation performed by the user on the control unit 5 or a command signal received from an external device, in S1 the CPU 11 executes a light intensity adjustment process according to the control program described above. In the light intensity adjustment process, the CPU 11 controls the reading devices 30 and 40 to execute light emission and reception operations. That is, the CPU 11 controls the reading devices 30 and 40 to emit light from the light sources 31 and 41 and to receive light reflected off the reference members 33 and 43 with the light-receiving units 32 and 42. Based on the read data corresponding to signals from the light-receiving units 32 and 42 indicating the intensities of received light, the CPU 11 adjusts the intensities of light emitted from the light sources 31 and 41 to desired intensities.

(2) Correction Data Generation Process

In S2 the CPU 11 executes a correction data generation process following completion of the light intensity adjustment process. In the correction data generation process, the CPU 11 acquires black reference data based on read data corresponding to signals received from the light sources 31 and 41 when not emitting light, and acquires white reference data based on read data corresponding to signals received during the above light emission and reception operations. Next, the CPU 11 generates correction data to be used for shading correction based on the black reference data and white reference data and stores this correction data in the RAM 13, for example. Hereinafter, the light emission and reception operations performed using the reading devices 30 and 40 to acquire white reference data will be referred to as a "reference reading operation."

(3) Image Reading Process

In S3 the CPU 11 executes an image reading process after completion of the correction data generation process. When the CPU 11 determines that an original M is present on the tray 2 according to the detection signal SG1 received from the front sensor 26, the CPU 11 controls the drive circuit 17 to beginning driving the conveying mechanism 28. Through this operation, the conveying mechanism 28 conveys one sheet of the original M provided in the tray 2 into the paper-conveying path 22.

When the CPU 11 subsequently determines that the rear sensor 27 has detected the original M based on the detection signal SG2 received from the rear sensor 27, the CPU 11 uses this detection timing as a trigger to execute the light emission and reception operations for controlling the reading devices 30 and 40 to emit light from the light sources 31 and 41 and to receive the light reflected off the original M with the light-receiving units 32 and 42, thereby reading images from the original. Hereinafter, the light emission and reception operations performed at this time will be referred to as an "image reading operation."

(4) Image Data Correction Process

In S4 the CPU 11 executes an image data correction process. In this process, the CPU 11 corrects image data read during the image-reading process based on the correction data generated in the correction data generation process and outputs the corrected image data to a terminal device or printer (not shown), for example, that is connected to and capable of communicating with the image-reading device 1. After completing the image data correction process, the CPU 11 ends the current control process.

4. Positional Relationships Among Components of the Image-Reading Unit

Figure 6:
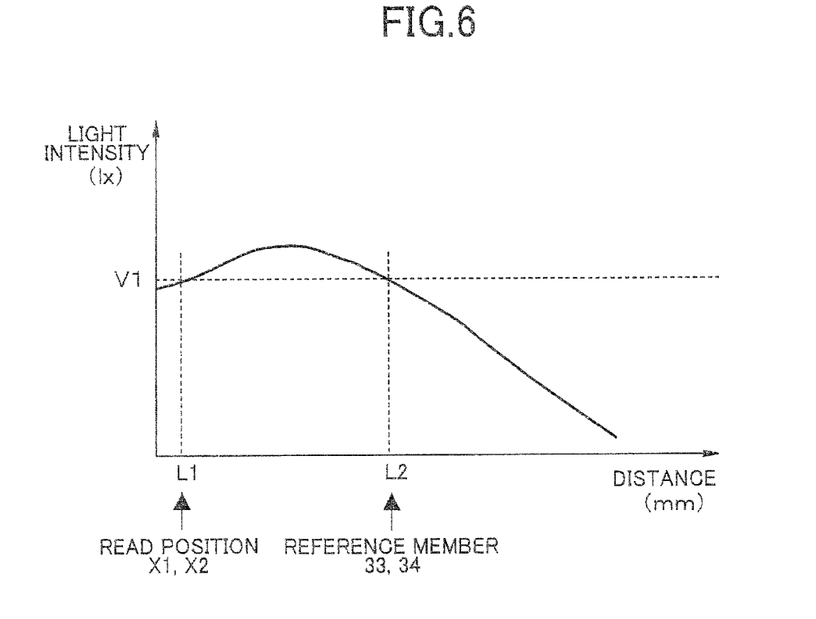
FIG. 6 is a graph showing a light intensity curve for the reading devices according to the first embodiment of the present invention.
Figure 7:
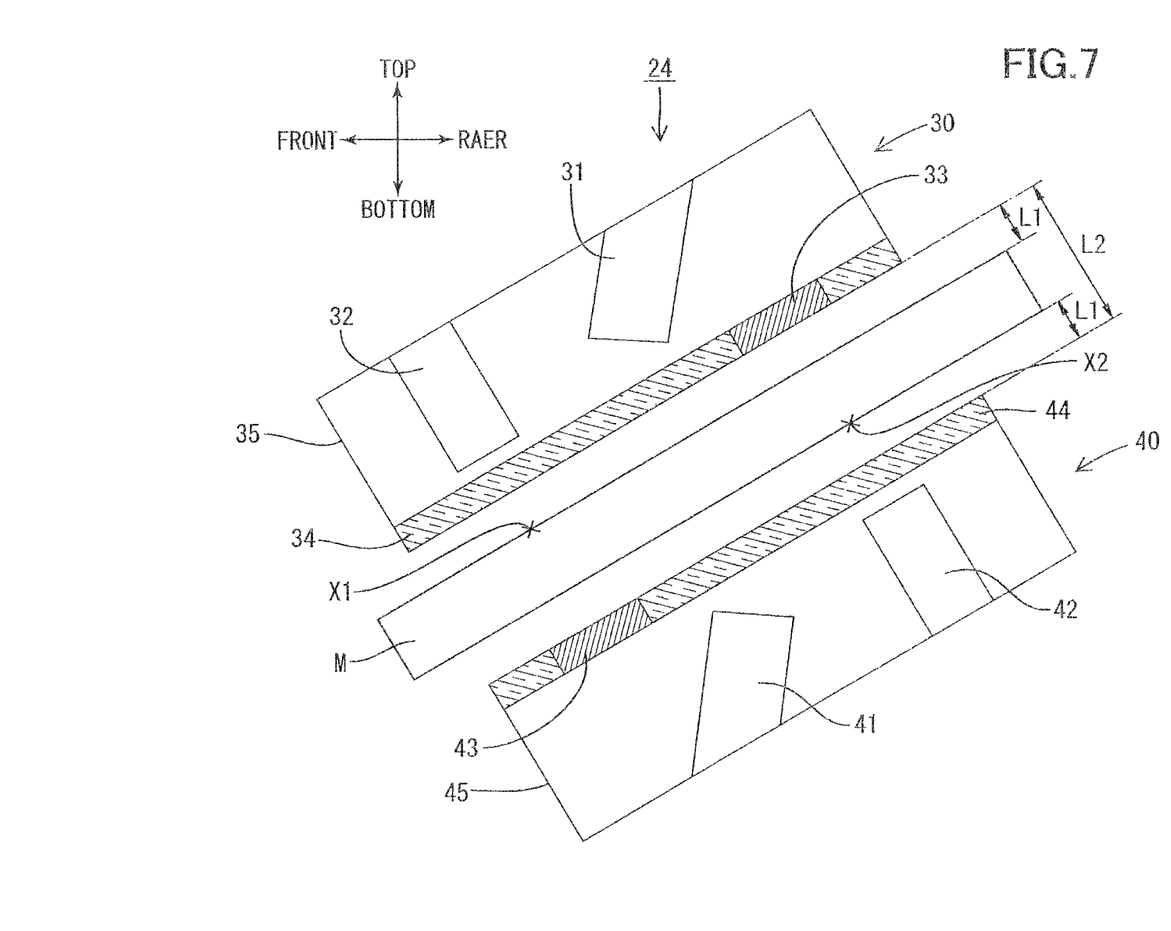
FIG. 7 is a general schematic diagram of the image-reading unit in which an original is interposed between the reading devices.

In FIG. 6, the vertical axis represents light intensity and the horizontal axis represents the distance from the surface of the platen glasses 34 or 44 constituting the reading devices 30 and 40, respectively. The light intensity represents intensity of light that is part of the reflected light reflected off an irradiated subject at a prescribed distance from the surface of the platen glass 34 or 44 and is received by the light-receiving unit 32 or 42. Alternatively, the horizontal axis may represent the distance from the light-receiving unit 32 or the distance from the light-receiving unit 42. In FIG. 7, the original M is interposed between the reading devices 30 and 40 of the image-reading unit 24.

In this embodiment, the light sources 31 and 41 of the reading devices 30 and 40 have substantially the same light intensity characteristics. These characteristics are plotted on a light intensity curve in the graph of FIG. 6. The light intensity curve is defined as a relationship between the light intensity representing intensity of light received by each light-receiving unit 32 or 42 and a distance from each platen glass 34 or 44. As shown in the graph, the light intensity curve depicts a parabola in which the intensity of light received by the light-receiving unit 32 (or light-receiving unit 42) temporarily increases as the distance between the surface of the platen glass 34 (or platen glass 44) and the position of the irradiated subject grows and gradually decreases thereafter. This light intensity curve can be derived through experiments, from the specifications of the light-receiving units 32 and 42, and the like. Accordingly, the light intensity curve has two positions at differing distances from the surface of the platen glass 34 (or platen glass 44) that have substantially the same light intensity. That is, the light intensity value is a substantially equivalent V1 (lx) for positions at distances of D1 and D2 (mm) from the surface of the platen glass 34 (or platen glass 44).

Hence, in this embodiment the alignment of the reading device 30 is adjusted so that a distance between the surface of the platen glass 34 and a read position X1 is set to the distance D1 and a distance between the surface of the platen glass 34 and the reference member 43 is set to the distance D2, as shown in FIG. 7. These positional relationships can be set by adjusting the positional relationships between the reading device 30 and the conveying rollers 23 and discharge rollers 25 disposed before and after the reading device 30. Here, the read position X1 preferably falls on the upper surface of the original M, while the conveying rollers 23 and discharge rollers 25 grip and apply tension to the original M. In other words, the distance from the surface of the platen glass 34 to the read position X1 is preferably equivalent to the distance from the surface of the platen glass 34 to the original M while the conveying rollers 23 and discharge rollers 25 grip and apply tension to the original M. The read position X1 and reference member 43 are preferably positioned within the focal depth range of the light-receiving unit 32. That is, the read position X1 is aligned with the light-receiving unit 32 in a direction perpendicular to the paper-conveying path 22.

Similarly, the alignment of the reading device 40 is adjusted so that a distance between the surface of the platen glass 44 and a read position X2 is set to the distance D1 and a distance between the surface of the platen glass 44 and the reference member 33 is set to the distance D2, as shown in FIG. 7. These positional relationships can be set by adjusting the positional relationships between the reading device 40 and the conveying rollers 23 and discharge rollers 25 disposed before and after the reading device 40. Here, the read position X2 preferably falls on the lower surface of the original M, while the conveying rollers 23 and discharge rollers 25 grip and apply tension to the original M. In other words, the distance from the surface of the platen glass 44 to the read position X2 is preferably equivalent to the distance from the surface of the platen glass 44 to the original M while the conveying rollers 23 and discharge rollers 25 grip and apply tension to the original M. The read position X2 and reference member 33 are preferably positioned within the focal depth range of the light-receiving unit 42. That is, the read position X1 is aligned with the light-receiving unit 32 in a direction perpendicular to the paper-conveying path 22. While the read positions X1 and X2 in FIG. 7 are set with consideration for the thickness of the original M, the thickness of the original M may be ignored since the original M is generally very thin.

5. Effects of the First Embodiment

In the first embodiment, the distance between the platen glass 34 (or platen glass 44) and the read position X1 (or read position X2) differs from the distance between the platen glass 34 (or platen glass 44) and the reference member 43 (or reference member 33), and the reading devices 30 and 40 are arranged so that the read positions X1 and X2 and the reference members 33 and 43 fall in positions having substantially the same light intensity on the light intensity curve of the corresponding light-receiving units 32 and 42. Therefore, the image-reading device 1 can generate shading correction data that minimizes the effects of a difference between the distance from the platen glass 34 (or platen glass 44) to the reference member 43 (or reference member 33) that is related to the shading correction (see FIG. 3) and the distance between the platen glass 34 (or platen glass 44) and the read position X1 (or read position X2) that is related to the image reading operation of original M (see FIG. 7), without requiring an operation to remove the reference members or a mechanism for moving the same. Thus, this embodiment can reduce the size and cost of the case for the image-reading device 1 itself over a structure that requires removal of the reference members or a mechanism for moving the same.

Further, the reading devices 30 and 40 are disposed on opposing sides of the paper-conveying path 22. Since this structure requires that the original M be conveyed to a suitable position relative to the reading devices 30 and 40, there is a particularly high likelihood of a difference occurring between the distance from the platen glass 34 (or platen glass 44) to the reference member 33 (or reference member 43) that is related to the shading correction and the distance from the platen glass 34 (or platen glass 44) to the read position X1 (or read position X2) that is related to the image reading operation. Hence, the image-reading device 1 can particularly minimizes the difference between the above distances.

Further, since the reading devices 30 and 40 have similar light intensity characteristics (light intensity curves), the reference member 33 of the reading device 30 and the reference member 43 of the reading device 40 can be arranged symmetrically about the paper-conveying path 22 (see FIG. 7). Further, since the original M is conveyed in the widthwise center of the paper-conveying path 22, paper jams with the original are less likely to occur than in a structure that conveys the original M through a position biased toward one of the reading devices.

Second Embodiment

Figure 8:
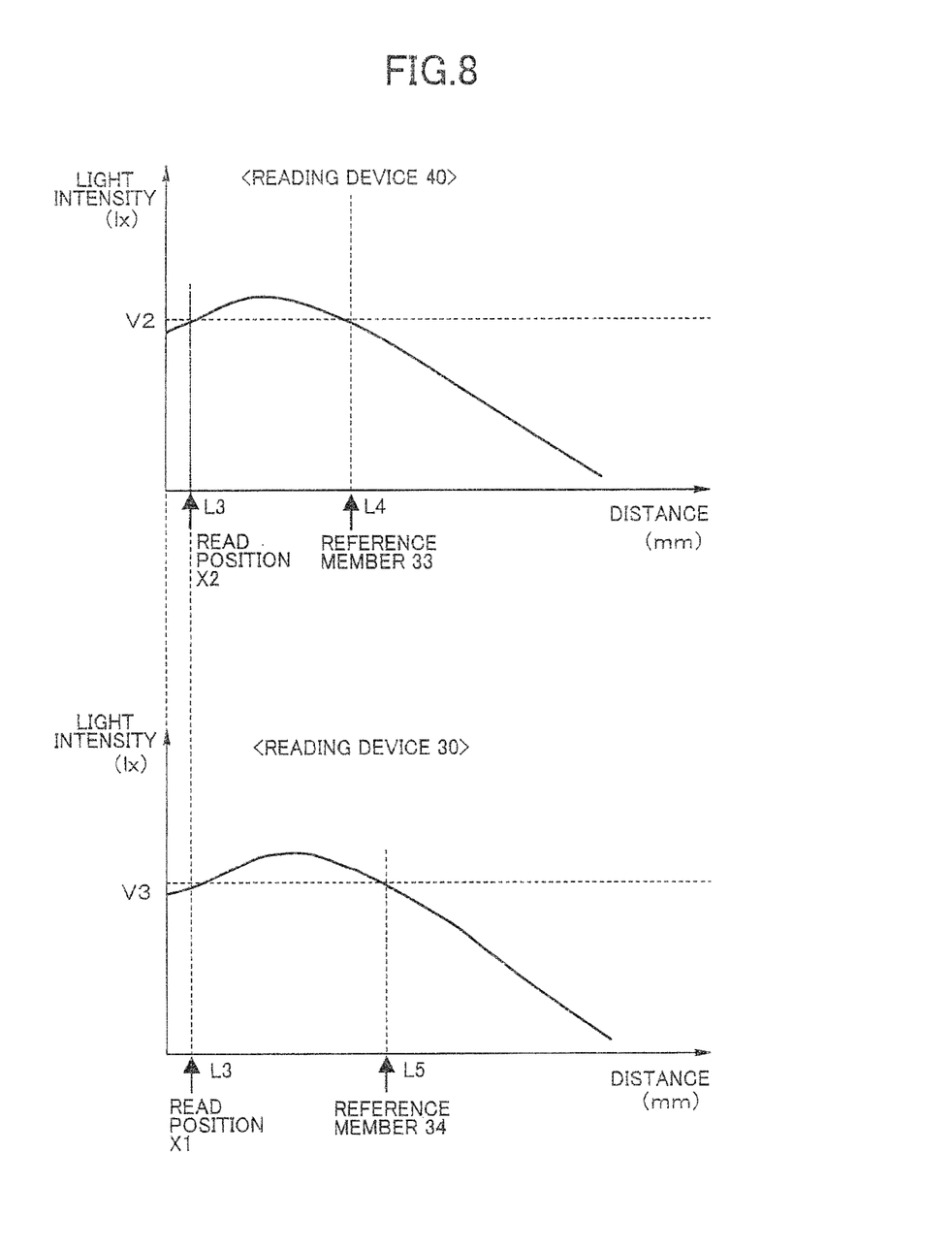
FIG. 8 shows light intensity curves for the reading devices according to a second embodiment of the present invention.
Figure 9:
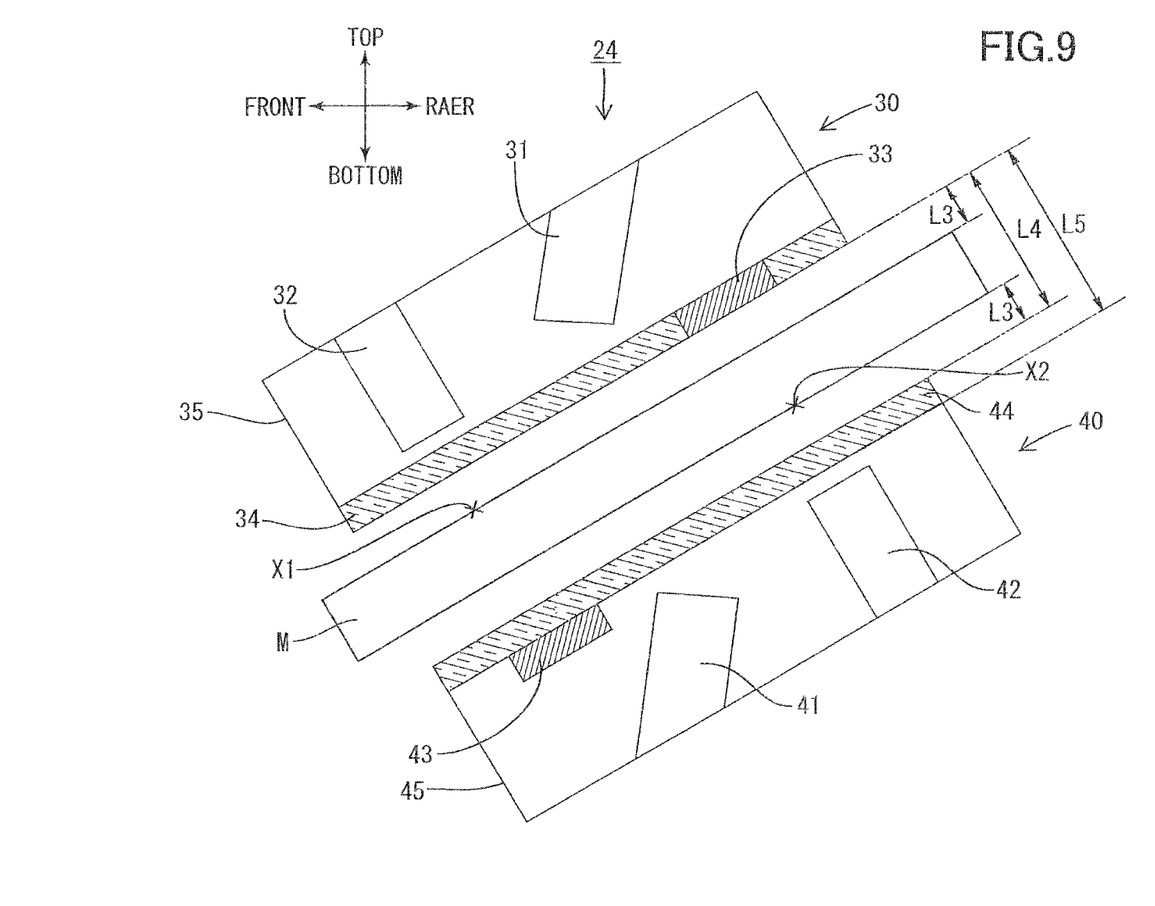
FIG. 9 shows a general schematic diagram of the image-reading unit according to the second embodiment of the present invention in which an original is interposed between the reading devices.

FIGS. 8 and 9 illustrate the specifications of the image-reading unit 24 according to a second embodiment of the present invention. The image-reading unit 24 according to the second embodiment differs from the first embodiment only in the light intensity characteristics of the reading devices 30 and 40 and the positional relationship between the reading devices 30 and 40 and the reference members 33 and 43. Since the remaining structure of the image-reading unit 24 is identical to that in the first embodiment, like parts and components are designated with the same reference numerals to avoid duplicating description. Only the differing points of the second embodiment will be described below.

1. Positional Relationships Among Components of the Image-Reading Unit

In FIGS. 8($a$) and ($b$), the vertical axis represents light intensity and the horizontal axis indicates the distance from the surface of the platen glasses 34 or 44. Alternatively, the horizontal axis may designate the distance from the light receiving unit 32 or 42. In FIG. 9, the original M is interposed between the reading devices 30 and 40.

In the second embodiment, the light sources 31 and 41 of the reading devices 30 and 40 have differing light intensity characteristics, as can be seen from the light intensity curves shown in FIG. 8. As shown in the graphs, the light intensity curve for the reading device 30 forms a gentler parabola than the light intensity curve for the reading device 40. This difference in light intensity characteristics can be attributed to differences in the characteristics of the light-emitting elements and optical systems or manufacturing irregularities.

In the light intensity curve for the reading device 30 shown in FIG. 8(b), the light intensity value is a substantially equivalent V3 (lx) for positions at distances of D3 and D5 (mm) from the surface of the platen glass 34. Consequently, the alignment of the reading device 30 is adjusted as shown in FIG. 9 so that a distance between the surface of the platen glass 34 and the read position X1 is set to the distance L3 and a distance between the surface of the platen glass 34 and the reference member 43 is set to the distance D5.

In the light intensity curve for the reading device 40 shown in FIG. 8(a), the light intensity value is a substantially equivalent V2 (lx) for positions at distances of D3 and D4 (mm) from the surface of the platen glass 44. Accordingly, the alignment of the reading device 40 is adjusted as shown in FIG. 9 so that a distance between the surface of the platen glass 44 and the read position X2 is set to the distance D3 and a distance between the surface of the platen glass 44 and the reference member 33 is set to the distance D4 (less than the distance D5). Here, the light intensity value V2 of the reading device 40 is preferably about the same as the light intensity value V3 of the reading device 30.

In addition, the reference member 43 is disposed inside the carriage 45 of the reading device 40 in the second embodiment to set the distance from the surface of the platen glass 34 to the read position X1 substantially equivalent to the distance from the surface of the platen glass 44 to the read position X2. In other words, the reference member 43 is provided on the rear surface of the platen glass 44 for forming the distance D5 between the surface of the platen glass 34 and the reference member 43. Therefore, during a reference reading operation, the light emitted from the light source 31 passes through the platen glass 44 and is irradiated on the reference member 43, and the light-receiving unit 32 receives light reflected by the reference member 43.

2. Effects of the Second Embodiment

In the second embodiment described above, the light intensity characteristics (the light intensity curves) of the reading devices 30 and 40 differ. However, since the distance from the platen glass 34 of the reading device 30 to the read position X1 is equivalent to the distance from the platen glass 44 of the reading device 40 to the read position X2, paper jams with the original are less likely to occur than in a structure that conveys the original M through a position biased toward one of the reading devices.

Third Embodiment

Figure 10:
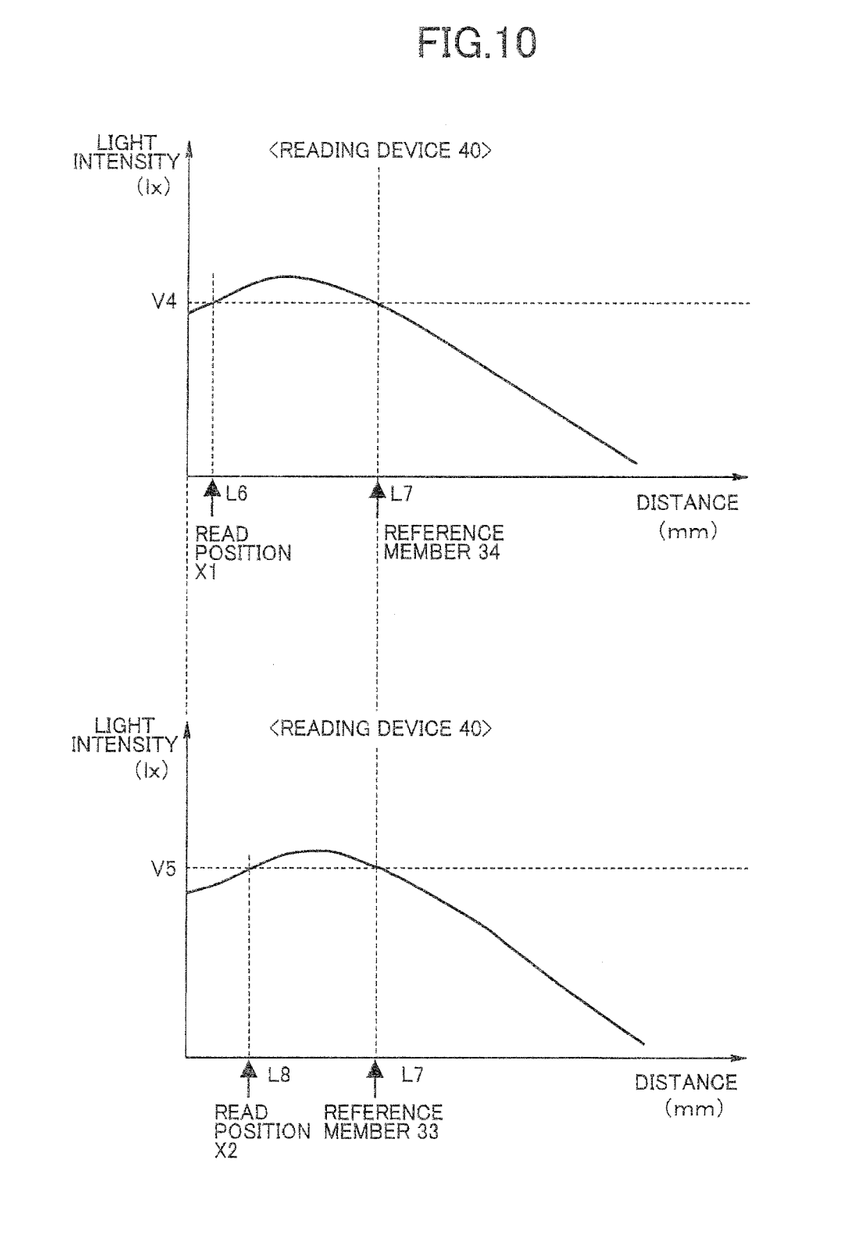
FIG. 10 shows light intensity curves for the reading devices according to a third embodiment of the present invention.
Figure 11:
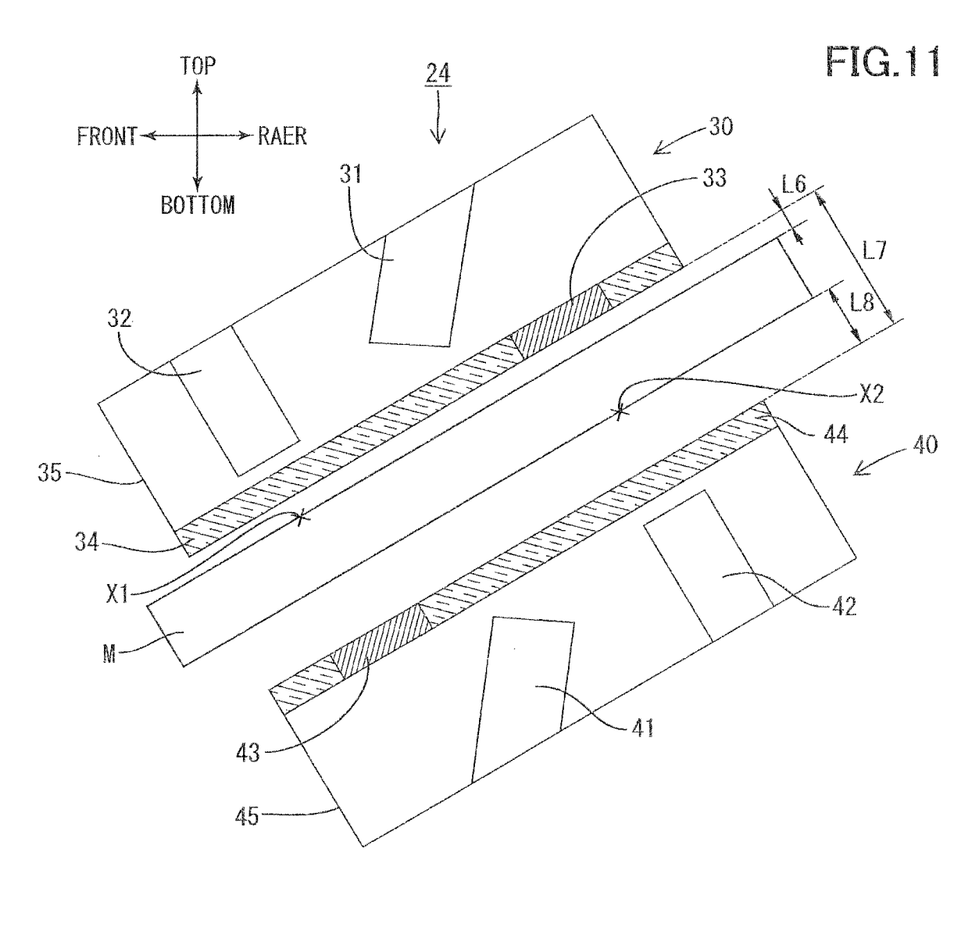
FIG. 11 shows a general schematic diagram of the image-reading unit according to the third embodiment of the present invention in which an original is interposed between the reading devices.

FIGS. 10 and 11 illustrate the specifications of the image-reading unit 24 according to a third embodiment of the present invention. The image-reading unit 24 according to the third embodiment differs from the first embodiment only in the light intensity characteristics of the reading devices 30 and 40 and the positional relationships between the reading devices 30 and 40 and the read positions X1 and X2. Since the remaining structure of the image-reading unit 24 is identical to that in the first embodiment, like parts and components are designated with the same reference numerals to avoid duplicating description. Only the differing points of the third embodiment will be described below.

1. Positional Relationships Among Components of the Image-Reading Unit

In FIGS. 10(a) and (b), the vertical axis represents light intensity and the horizontal axis indicates the distance from the surface of the platen glasses 34 or 44. Alternatively, the horizontal axis may designate the distance from the light receiving unit 32 or 42. In FIG. 11, the original M is interposed between the reading devices 30 and 40.

In the third embodiment, the light sources 31 and 41 of the reading devices 30 and 40 have differing light intensity characteristics, as can be seen from the light intensity curves shown in FIG. 10. As shown in the graphs, the light intensity curve for the reading device 40 forms a gentler parabola than the light intensity curve for the reading device 30.

In the light intensity curve for the reading device 30 shown in FIG. 10(a), the light intensity value is a substantially equivalent V4 (lx) for positions at distances of L6 and L7 (mm) from the surface of the platen glass 34. Therefore, the alignment of the reading device 30 is adjusted as shown in FIG. 11 so that the distance L6 is formed between the surface of the platen glass 34 and the read position X1 and the distance L7 is formed between the surface of the platen glass 34 and the reference member 43.

In the light intensity curve for the reading device 40 shown in FIG. 10(b), the light intensity value is a substantially equivalent V5 (lx) for positions at distances of L8 and L7 (mm) from the surface of the platen glass 44. Accordingly, the alignment of the reading device 40 is adjusted as shown in FIG. 11 so that a distance between the surface of the platen glass 44 and the read position X2 is set to the distance L8 (greater than the distance L6) and a distance between the surface of the platen glass 44 and the reference member 33 is set to the distance L7. Here, the light intensity value V4 of the reading device 40 is preferably about the same as the light intensity value V5 of the reading device 30.

2. Effects of the Third Embodiment

In the third embodiment described above, the distance from the platen glass 34 of the reading device 30 to the reference member 43 is equivalent to the distance from the platen glass 44 of the reading device 40 to the reference member 33. As a result, the original M is conveyed through a position biased toward the reading device 30, as shown in FIG. 11. However, the light source 31 and reference member 43 can be arranged symmetrically to the light source 41 and reference member 33 about the paper-conveying path 22, and the reading devices 30 and 40 may be provided with the same structure.

Variations of the Embodiments

While the invention has been described in detail with reference to specific embodiments thereof, it would be apparent to those skilled in the art that many modifications and variations may be made therein without departing from the spirit of the invention, the scope of which is defined by the attached claims.

(1) The image-reading device 1 according to the embodiments described above has only a function to read images. However, the present invention may be applied to a multifunction peripheral, copy machine, facsimile machine, or the like having functions in addition to an image-reading function, such as a printing function or facsimile function. Further, while the image-reading device 1 of the above embodiments is a sheet feed scanner, the image-reading device 1 may be configured as a flatbed scanner in which the original M remains in a fixed position during image reading, while the image-reading unit moves. In this case, the read positions would move with the image-reading unit.

(2) The conveying mechanism 28 described in the above embodiments is configured of a plurality of rollers, but the image-reading device 1 may utilize a conveying mechanism configured of a belt that is driven to circulate.

(3) In the embodiments described above, the reading devices 30 and 40 are arranged to confront each other across the paper-conveying path 22. However, the reading devices 30 and 40 may be disposed at positions along the paper-conveying path 22 that are offset in the conveying direction. Alternatively, the image-reading device may be provided with only one reading device. In this case, a reference member is provided for the one reading device at an opposite side of the paper-conveying path 22 from the one reading device.

(4) In the embodiments described above, both the reading devices 30 and 40 are controlled to execute the reference reading operation and image reading operation. However, one of the reading devices 30 and 40 may be configured to execute the reference reading operation and image reading operation alone when the user has selected a single-side reading mode through operations on the control unit 5.

(5) In the above embodiments, the image-reading device 1 executes the image data correction process of S4 itself, but the image-reading device 1 may also output image data and correction data to an external device and have the external device execute the image data correction process.

(6) In the above embodiments, the control circuit 10 is provided with a single CPU 11 for executing the image-reading process. However, the control circuit 10 may be provided with a plurality of CPUs 11 for executing the above control process. The CPUs may be configured to individually execute all or some of the processes for image-reading process, data generating process, and data correction process. Further, the CPU of the control circuit 10 is not limited to a general purpose CPU, but may be configured of a special circuit, such as an application-specific integrated circuit or a field-programmable gate array.

What is claimed is:

1. An image-reading device comprising:
    a first reading unit comprising a first light source and a first light-receiving unit and configured to read a first image on an original at a first read position, the first reading unit being configured such that the first light source emits a light, part of the light is reflected off a first irradiated subject, part of a first reflected light is received by the first light-receiving unit;
    a first reference member;
    a control unit configured to execute a first image-reading process, a first reference-reading process, and a first data generating process, in the first image-reading process the first light source emitting a light to the first read position to irradiate the original and the first light-receiving unit receiving part of a reflected light reflected off the original, in the first reference-reading process the first light source emitting a light to the first reference member and the first light-receiving unit receiving part of a reflected light reflected off the first reference member, in the first data generating process shading correction data being generated based on a receiving result of the first light-receiving unit in the first reference-reading process; and
    wherein a first light intensity curve is defined as a relationship between a first light intensity and a distance from the first reading unit, the first light intensity representing intensity of light that is part of a reflected light reflected off the first irradiated subject positioned at the distance from the first reading unit and is received by the first light-receiving unit, the first light intensity curve having a first intensity value at a first distance and a second intensity value at a second distance, the first intensity value being equivalent to the second intensity value, the first distance being different from the second distance, a distance between the first reading unit and the first read position being set to the first distance, a distance between the first reading unit and the first reference member being set to the second distance.

2. The image-reading device according to claim 1, further comprising a conveying mechanism configured to convey the original along an original conveying path;
    a second reading unit comprising a second light source and a second light receiving unit and configured to read a second image on the original at a second read position, the original conveying path being interposed between the first reading unit and the second reading unit, the second reading unit being configured such that the second light source emits a light, part of the light is reflected off a second irradiated subject, part of a reflected light is received by the second light-receiving unit; and
    a second reference member provided on the first reading unit side with respect to the original conveying path to be irradiated with a light from the second light source, the first reference member being provided on the second reading unit side with respect to the original conveying path to be irradiated with a light from the first light source, and
    wherein the control unit is configured to execute a second image-reading process, a second reference-reading process, and a second data generating process, in the second image-reading process the second light source emitting a light to the second read position to irradiate the original and the second light-receiving unit receiving part of a reflected light reflected off the original, in the second reference-reading process the second light source emitting a light to the second reference member and the second light-receiving unit receiving part of a reflected light reflected off the second reference member, in the second data generating process shading correction data being generated based on a receiving result of the second light-receiving unit in the second reference-reading process,
    wherein a second light intensity curve is defined as a relationship between a second light intensity and a distance from the second reading unit, the second light intensity representing intensity of light that is part of a reflected light reflected off the second irradiated subject positioned at the distance from the second reading unit and is received by the second light-receiving unit, the second light intensity curve having a third intensity value at a third distance and a fourth intensity value at a fourth distance, the third intensity value being the same as the fourth intensity value, the third distance being different from the fourth distance, a distance between the second reading unit and the second read position being set to the third distance, a distance between the second reading unit and the second reference member being set to the fourth distance.

3. The image-reading device according to claim 2, wherein the first light intensity curve is equivalent to the second light intensity curve,
    wherein a distance between the first reading unit and the first read position is equivalent to a distance between the second reading unit and the second read position, and wherein a distance between the first reading unit and the first reference member is equivalent to a distance between the second reading unit and the second reference member.

4. The image-reading device according to claim 2, wherein the first light intensity curve is different from the second light intensity curve,
   wherein a distance between the first reading unit and the first read position is equivalent to a distance between the second reading unit and the second read position, and
   wherein a distance between the first reading unit and the first reference member is different from a distance between the second reading unit and the second reference member.

5. The image-reading device according to claim 2, wherein the first light intensity curve is different from the second light intensity curve,
   wherein a distance between the first reading unit and the first read position is different from a distance between the second reading unit and the second read position, and
   wherein the distance between the first light source and the first reference member is equivalent to the distance between the second reading unit and the second reference member.

6. The image-reading device according to claim 1, wherein the first reading unit reads the first image on the original to obtain image data, and
   the control unit is configured to execute a data correction process, the image data being corrected based on the shading correction data generated in the data correction process.

7. A manufacturing method of an image-reading device comprising an reading unit and a reference member, the reading unit including a light source and a light receiving unit and configured to read an image on an original at a read position, the reading unit being configured such that the light source emits a light, part of the light is reflected off an irradiated subject, part of a reflected light is received by the light-receiving unit, the manufacturing method comprising:
   acquiring a light intensity curve that is defined as a relationship between a light intensity and a distance from the reading unit, the light intensity representing intensity of light that is part of a reflected light reflected off the irradiated subject positioned at the distance from the reading unit and is received by the first light-receiving unit, the light intensity curve having a first intensity value at a first distance and a second intensity value at a second distance, the first intensity value being equivalent to the second intensity value, the first distance being different from the second distance; and
   setting a distance between the reading unit and the read position to the first distance, and setting a distance between the reading unit and the reference member to the second distance.

* * * * *